United States Patent [19]
Knockeart et al.

[11] 3,915,284
[45] Oct. 28, 1975

[54] AUTOMATIC OBJECT ROUTING SYSTEM

[75] Inventors: Ronald P. Knockeart, Walled Lake; Edwin A. Johnson, Clarkston; Frank A. Russo, Farmington, all of Mich.

[73] Assignee: The Bendix Corporation, Southfield, Mich.

[22] Filed: Nov. 23, 1973

[21] Appl. No.: 418,521

[52] U.S. Cl. .................. 198/34; 198/38; 214/11 A
[51] Int. Cl.² ........................................ B65G 47/26
[58] Field of Search ........ 198/38, 34, 40; 214/11 R, 214/11 A; 209/74

[56] References Cited
UNITED STATES PATENTS

| | | | |
|---|---|---|---|
| 3,260,349 | 7/1966 | Vander Meer | 214/11 R X |
| 3,563,395 | 2/1971 | Gary | 198/38 |
| 3,725,867 | 4/1973 | Jordan | 198/38 |
| 3,786,939 | 1/1974 | Habegger et al. | 214/11 A |
| 3,803,556 | 4/1974 | Duffy | 198/38 X |

Primary Examiner—Evon C. Blunk
Assistant Examiner—James M. Slattery
Attorney, Agent, or Firm—Lester L. Hallacher

[57] ABSTRACT

The invention is directed to a system for routing assorted items to preselected destinations. The items to be routed are deposited at any of various reception areas and automatically routed to a particular final destination depending upon the nature of the item. Each item carries a machine readable label, such as a bar coded label, which is scanned by an appropriate scanning mechanism. Information encoded onto the label is then obtained by the scanning mechanism and is injected into appropriate logic decoding circuitry where it is decoded to identify the item, its destination, or both. The decoded information is then applied to the system control logic which routes the label bearing item to the appropriate destination. Movement of items within the system is affected by conveyors or similar devices and appropriately located diverters to control transfer of the items to various conveyor loops or spurs.

13 Claims, 12 Drawing Figures

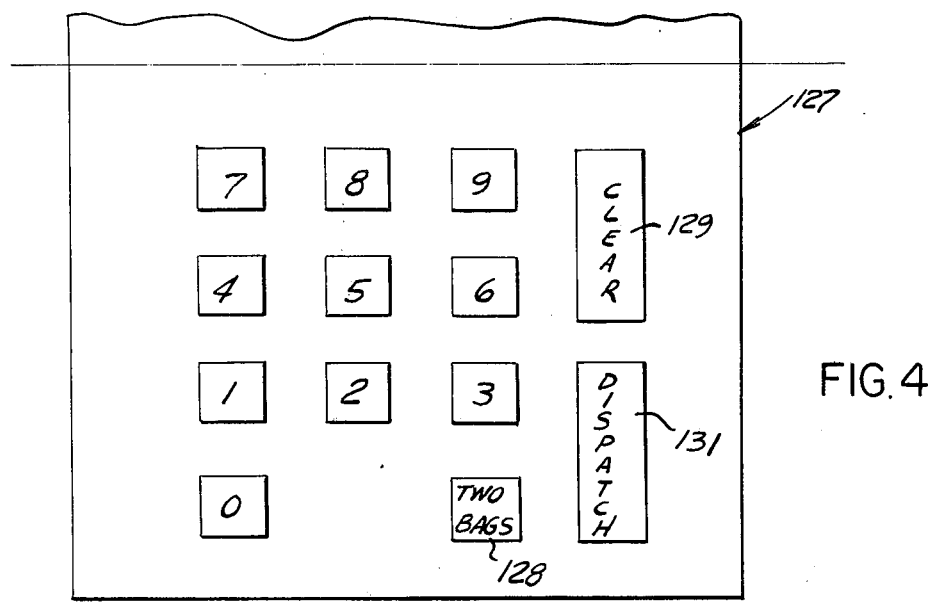
FIG. 4
FIG. 5
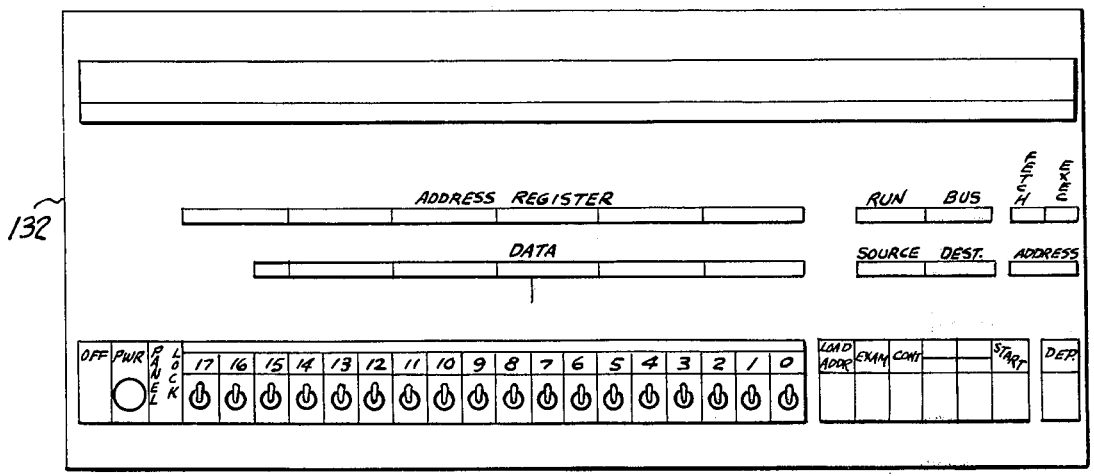
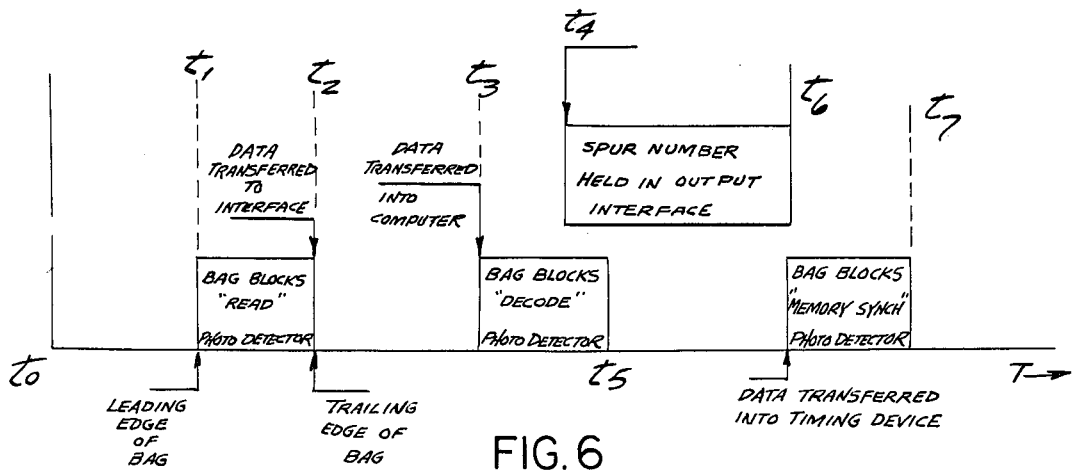
FIG. 6

AUTOMATIC OBJECT ROUTING SYSTEM

CROSS REFERENCE TO RELATED APPLICATIONS

Patent application Ser. No. 207,206 filed by Ronald P. Knockeart and Frank A. Russo on Dec. 13, 1971 entitled "Constant Spacing Coded Label," and assigned to the assignee of the instant application describes a label which can be utilized in the instant application.

Patent application Ser. No. 207,083 filed by Ronald P. Knockeart, Frank Russo, and Edwin Johnson on July 19, 1972 and now U.S. Pat. No. 3,740,666 entitled "Symmetrically Encoded Label" and assigned to the assignee of the instant application describes another label which can be used in the inventive system.

U.S. Pat. No. 3,735,096 by Ronald P. Knockeart and Frank A. Russo on May 22, 1973 entitled "Label Reader Logic Circuitry" and assigned to the assignee of the instant application describes logic circuitry which can be used to decode the information received from a bar coded label useful with the inventive system.

Patent application Ser. No. 207,036, filed by Ronald P. Knockeart on Dec. 13, 1971 and now U.S. Pat. No. 3,813,140 entitled "Narrow Band Optical System" and assigned to the assignee of the instant application describes an optical scanning system which can be used in the inventive system.

BACKGROUND OF THE INVENTION

The need for automatic identification and routing of articles arises in many varied environments, such as warehousing, where items arriving at the warehouse must be unloaded from various vehicles and routed to the particular areas where the items will be stored. Another article routing need arises at airline terminals where passengers arriving for departure on various aircraft deposit baggage at ticket counters and other check-in points. The checked bags must then be routed to the specified airline loading docks where they are loaded onto the aircraft.

In many existing nonautomatic warehousing and airline baggage routing systems the items being routed along the system conveyors are diverted to different conveyors at various points along the line so that the items ultimately arrive at the desired destination. However, as the items are being loaded onto the input end of the conveyor the various items usually are intended for many different ultimate destinations. Accordingly, at each diverting point a person must visually identify each item and transfer it to the next conveyor which will further the item in its journey to the ultimate destination. Because of the speed of the conveyors, the number of items on the conveyor, and the large number of ultimate destinations human errors frequently occur so that items arrive at the wrong destination and must be rerouted or hand carried to their proper destination. Accordingly, many attempts have been made to automate routing systems to eliminate the need for visual reading in an attempt to decrease the number of routing errors.

SUMMARY OF THE INVENTION

The invention is directed to a system for automatically routing items to their final destination without the need for people to divert the items as transfer from one conveyor to another is required. The preferred embodiment described herein is set into the environment of automatic baggage routing and separation for the airline industry but it should be understood that the inventive concepts are useful in warehousing and other environments requiring automatic article routing.

The existing airline baggage handling systems require various baggage handling techniques depending upon the actions of the arriving passenger. When an arriving passenger has a ticket, his baggage can be checked with a skycap at the airport terminal entrance. The skycap applies baggage identification tickets to the bag in accordance with the flight number and destination of the passenger. The skycap then proceeds to manually carry the bag to the appropriate conveyor for the passenger's intended flight. The passenger can then proceed directly to the aircraft without regard for his bag. Alternatively, when a passenger has a ticket, he can proceed to the ticket counter where his bag is checked. The ticketing personnel then apply an identification tag to the bags and put them onto a conveyor which carries the bags to the proper loading area so that they are ultimately loaded onto the proper aircraft.

In those instances where a passenger must purchase a ticket, he proceeds to the ticket counter, purchases a ticket, and the ticketing personnel then applies the baggage identification ticket to the checked baggage and places the baggage into the conveyor system. In all of the above instances routing of the bags within the conveyor system requires visual reading of the baggage identifying tags so that the bags are transferred to the conveyors consistent with the destinations of the bags.

The inventive system operates to handle baggage in much the same manner with the added feature that the individual airline employee who applies the identification tags to the bags also applies a machine readable label to each bag. The machine readable label is used to properly divert the bag at various diverting stations along the conveyor route so that the bag arrives at the proper destination without the necessity of people having to divert the bags at the various diverting stations.

In the inventive system, all bags arriving at an airport for a particular airline are put into a conveyor system which includes one or more mechanisms for automatically reading the machine readable labels present on each bag. The bags travel past the scanning mechanism and the labels are read and decoded to identify the destination of the bags. The decoded information is then used to divert the bags to their proper loading destination so that they are available for loading onto the proper aircraft.

Because it is possible for a label to become marred, or fall off, the inventive system includes a claim loop where bags carrying unreadable labels or no labels are routed. Bags entering this loop are either visually identified, a new label applied, and then reinjected into the system or hand carried to their proper destination.

The conveyor system employed with the inventive system includes a series of collection areas or spurs which are used to collect all baggage for a given flight. As soon as the baggage for a particular flight is unloaded from the spur, the spur is assigned to a different flight and starts receiving bags for the subsequent flight.

Briefly described operationally, the inventive system receives bags or other items depending on the exact use of the system, from curb dropoffs, ticket counters, and any other convenient areas desired. All items are routed along the same conveyor system, and pass through a scanner which is used to decode the routing information carried by the items. The decoded information is used to route the items to the various collection areas without the need for human handling or direction along the conveyor system. When the invention is used for airline baggage routing the decoded information includes the flight number and destination, and if necessary, the name of the airline.

Routing of the bags is accomplished by assigning a definite spur (or if necessary, several spurs) to each individual flight. The assignment of spurs by flight number, or destination, is made on a daily schedule basis and is stored in a memory device. When a bag has been scanned, and the coded information decoded, the decoded information is transmitted to the memory device which identifies the spur destination of the bag.

While being scanned, the bag trips a photodetector positioned in the immediate proximity of the scanner to indicate that the bag is now entering into the spur routing system. The photodetector is the first in a series of such devices. The series of photodetectors is used to assure proper bag spacing, reject excessively long bags, correctly route unreadable bags, and generate a synchronizing pulse required for diversion of the bags onto the correct spurs. The synchronizing pulse is generated for every bag passing through the series of photodetectors. Upon generation, the synchronizing pulse is applied to a timing device along with a diverting command. The time countdown of the timing device is synchronized with the speed of the conveyor along which the bag is travelling. Because the speed of the conveyor is a constant, it is known that the bag will pass its intended spur in a specific amount of time after generation of the synchronizing pulse. The timing device counts down the known time period corresponding to the diverting command and then generates a diverting pulse. The diverting pulse actuates a diverter as the bag passes in front of its intended spur and the bag is directed onto the proper spur. Because the bags pass through the scanner singly, the bags remain separated on the conveyor and the sequence of synchronizing pulses is identical to the sequence of bags through the scanner.

When a bag passes through the scanning mechanism without a label, or carrying a label which cannot be properly read, a No-Read signal is generated as a diverting command. The No-Read signal is used to divert bags to a claim loop, or a spur assigned to collect unread bags, where the bags are visually identified and specifically handled.

BRIEF DESCRIPTION OF THE DRAWINGS

FIG. 4 shows a keyboard used to manually inject data into the inventive system.

FIG. 5 shows the control panel of a preferred embodiment of a controller useful with the inventive system.

FIG. 6 is a timing diagram of the signals generated by the photodetectors shown in FIG. 2.

DETAILED DESCRIPTION

Figure 1:
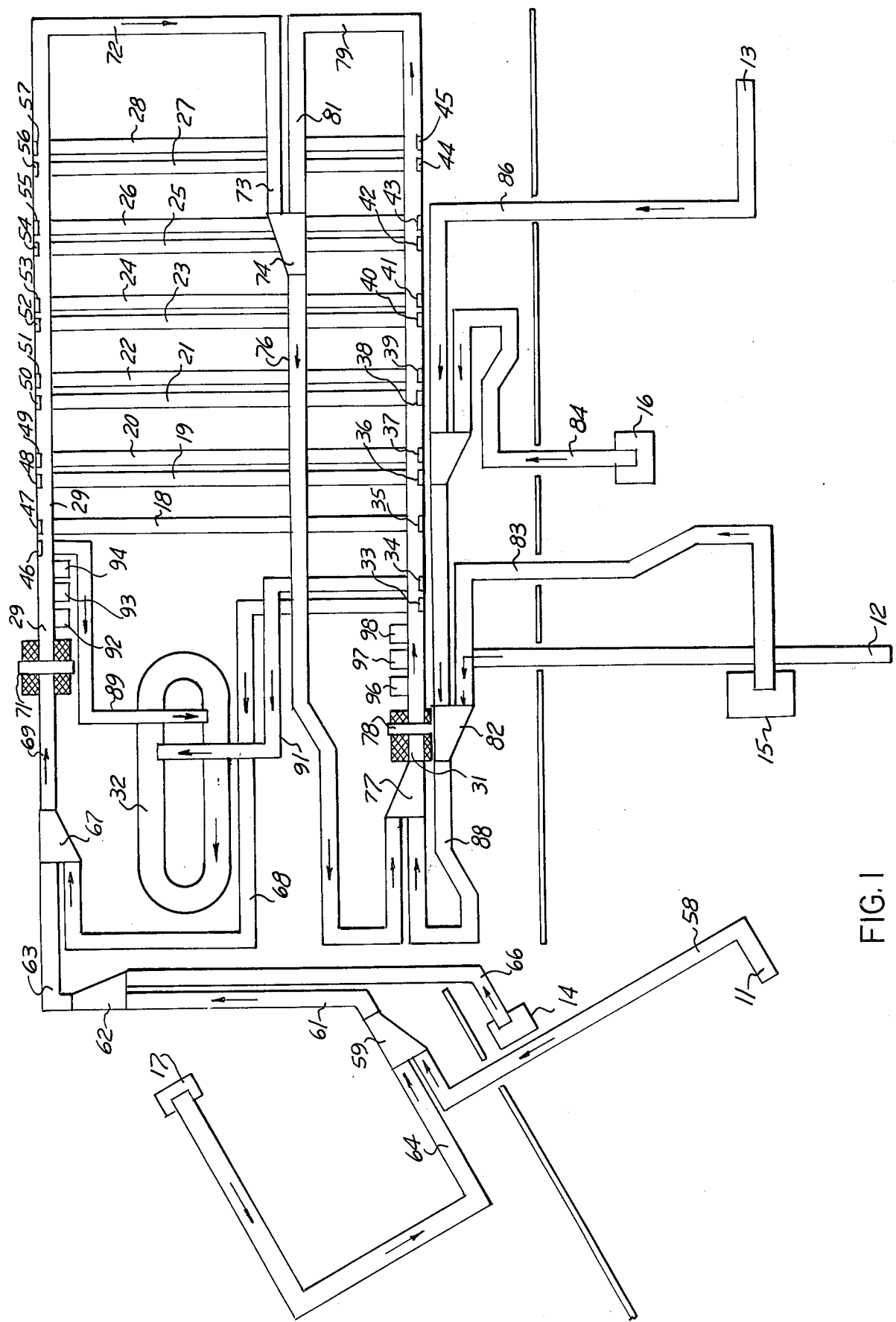
FIG. 1 is an illustration of a conveyor system including collection spurs and diverters and is useful in understanding an environment in which the invention can be used.

FIG. 1 pictorially illustrates the manner in which the inventive concept is incorporated into a baggage sortation system for an airline. The system includes a conveyor system which is used to convey and route baggage from incoming passengers to the various collection points so that the bags are available for subsequent loading onto the proper aircraft in accordance with the destination and flight of the passengers. The system includes three Curb Drop Areas 11, 12 and 13 where arriving passengers who already have tickets can deposit their baggage with an airline employee, such as a skycap. The employee applies a bar coded label to each bag and places the bag on the closest available conveyor. The bags are also identified with a visually readable tag and a similar tag is given to the passenger as a claim check. The passenger can then proceed directly to the airport terminal or the gate from which his scheduled flight will depart. It should be understood that the number and location of the curb drops is dependent upon the physical outlay of the airport terminal and is not limited to the configuration illustrated in FIG. 1. The only requirement is that every bag pass through a label scanner before entering the sortation conveyor system. Also shown in FIG. 1 are three Ticket Counters 14, 15 and 16. Passengers who have not already purchased a ticket, or who have a ticket but have not utilized the curb drop, can proceed to a ticket counter and either purchase a ticket or have their baggage checked. In either event, an airline employee applies an appropriately coded bar coded label to each bag and places the bags onto an available conveyor for automatic routing to the correct collecting areas in accordance with the coding on the labels. Exemplary labels which can be used in the inventive system are fully described in applications Ser. Nos. 207,206 and 207,083 fully referenced hereinabove.

In actual airline travel it is frequently necessary for a passenger and his bag to transfer from one aircraft to another; accordingly, the inventive system includes a Connecting Flight Spur 17. The baggage of passengers transferring from one flight to another is loaded onto this spur and is automatically directed to the collecting spur of the connecting flight. The label required for the connecting flight can be applied either at Connecting Flight Spur 17 or can be initially applied at the terminal at which the passenger initiated his flight. Thus, the inventive system is operative with one or more labels on an individual bag. After being loaded onto a conveyor at the connecting spur loading point, the bag travels along the conveyor system and is automatically routed to the proper collecting point without the need for any handling by individuals.

In FIG. 1, the collecting areas are identified as 18 through 28 and hereinafter are called spurs. Each of the Spurs 18 through 28 has one end connected to a Conveyor 29, which hereinafter is referred to as the North Sortation Conveyor and the other end connected to a Conveyor 31, which hereinafter is referred to as the South Sortation Conveyor. Both North Sortation Conveyor 29 and South Sortation Conveyor 31 move in the same direction, as illustrated movement on both conveyors is from left to right. Accordingly, baggage travelling along either of the conveyors can be directed to any of the spurs in accordance with the ultimate destination of the bag. The Spurs 18 to 28 therefore individually serve as collection points for all baggage destined for a particular flight by their assignment to specific flights for preselected time periods prior to the scheduled departure of the flights. As an example, if a Flight No. 123 is scheduled to leave the airport at 1:10 P.M., Spur 18 could be assigned to this flight and will collect bags for a period of time such as an hour or one-half hour prior to departure time. At 1:00 P.M., which is 10 minutes before the scheduled departure of the aricraft, Spur 18 is closed and receives no more bags. The baggage collected on Spur 18 is then gathered and loaded onto the aircraft. For this reason, the baggage of passengers arriving after 1:00 P.M. have to be hand carried to the aircraft to insure that they are loaded onto the proper aircraft.

Because the Spurs are automatically closed at specific times, it is possible for baggage to be applied to the conveyor system before the intended spur closes but arrive at the spur after the closing time. Baggage falling into this category is routed to a Claim Loop 32. The individual transferring baggage from the spur to the aircraft also proceeds to the Claim Loop 32 and gathers all bags which did not arrive at the intended spur. Other bags also are directed to Claim Loop 32 as explained hereinafter.

As stated hereinabove, Collection Spur 18 through 28 can be entered from either North Conveyor 28 or South Conveyor 31. Accordingly, the physical configuration of the Spurs 18 through 28 is optional. Each spur can be a single conveyor which is connected at opposite ends to the North and South Conveyors 29 and 31, respectively. Alternatively, spurs which are physically arranged one above the other can each be independently connected to the North and South Conveyors. In this configuration, baggage entering from North Conveyor 29 could be directed to the lower spur while baggage arriving from South Conveyor 31 would be directed to the upper spur. Hence, it should be apparent to those skilled in the art that the exact physical arrangement of the various spurs and conveyors is optional depending upon the space availability and other criteria at the area where the inventive system is installed.

Positioned along South Conveyor 31 are a plurality of Diverters 33 through 45. These diverters are used to divert bags moving along Conveyor 31 to the appropriate spur or other conveyors within the system depending upon the ultimate destination of the bag. The manner of actuating the diverters at the proper times so that bags are directed to the proper spurs is explained hereinafter with respect to the control system portion of the inventive system.

The general operation of the system can be best understood by tracing the flow of baggage entering the system from various points. First, assume that a bag is injected into the system at Curb Drop 11. The bag travels along Conveyor 58 to a Bag Merge And Spacer 59 and passes onto Conveyor 61. The bag travels along Conveyor 61 to another Bag Spacer 62 and ultimately is deposited onto Conveyor 63. Bag Merger 59 also couples Conveyor 64 to Connecting Flight Input 17. Accordingly, all bags deposited at both Curb Drop 11 and Connecting Flight 17 are routed to Conveyor 61.

Bag Merger And Spacer 59, and all other bag merger and spacers in the system, serve the twofold purpose of merging bags from two input conveyors to a single output conveyor and also spacing bags serially along the output conveyor.

Referring now to Ticket Counter 14, baggage deposited at this entry point moves along Conveyor 66 to Bag Spacer 62 and is deposited onto Conveyor 63. Hence, it is apparent that baggage injected into the system at either Curb Drop 11, Connecting Flight 17 or Ticket Counter 14 ultimately travels to Conveyor 63. All baggage on Conveyor 63 passes through Bag Spacer 67 which also receives bags from Conveyor 68. Conveyor 68 receives bags from South Conveyor 31 by way of Diverter 33. Hence, the South Conveyor 31 is coupled to North Conveyor 29 by way of Conveyor 68 and Conveyor Coupler 67.

All baggage passing through Bag Spacer 67 is deposited onto Conveyor 69 and directed to North Label Reader 71. Label Reader 71 can include a laser scanner of the type described in application Ser. No. 207,036 and decoding circuitry similar to that described in U.S. Pat. No. 3,735,096, so that the information coded onto the labels carried by the various bags is decoded and used to actuate the Diverters 46 to 57 and direct the bags to an appropiate one of the Spurs 18 through 28 in accordance with the destination of the bag.

Any bag not diverted to a spur travels to Conveyor 72, Branch 73 through Bag Spacer 74 and then to Conveyor 76. These bags travel along Conveyor 76 to Bag Spacer 77 and then pass through to South Reader 78. Reader 78 is identical in configuration to North Reader 71 and thus all labels attached to bags passing therethrough are scanned and decoded.

All items passing through Reader 78 are directed to the South Sorting Conveyor 31 and bags intended for one of the Spurs 18 through 28 are directed by one of the Diverters 33 through 45 to the correct spur.

Conveyor 31 also serves as an input to Bag Spacer 74 by way of Branch Conveyors 79 and 81. Accordingly, any bag which passes the entire length of either North Conveyor 29 or South Conveyor 31 without being diverted to one of the baggage Spurs 18 through 28 is recirculated around a recirculating loop including South Conveyor 31, Branch 79, Bag Spacer 74, Conveyor 76, Bag Spacer 77, and Reader 78. Bags are circulated around this loop when several bags are too closely spaced to assure proper diversion onto the spurs. This is explained more fully hereinafter with respect to FIGS. 2 and 6.

FIG. 1 also shows that bags which enter the system by way of Ticket Counters 15 and 16 or Curb Drop 12 and 13 are passed through Reader 78 by way of Bag Spacer 82 and Conveyor 88 over the various Conveyors 83, 84 and 86.

Any bag which passes through either of the Readers 71 or 78 without any label or with a damaged label is directed to Claim Loop 32. Either of these conditions results in the generation of a No-Read signal causing actuation of one of the Diverters 33 or 46 depending upon which Reader the unreadable label passed through. Diverter 46 directs bags onto Claim Loop 32 over Conveyor 89 and Diverter 33 directs bags onto Claim Loop 32 over Conveyor 91. These bags can then be visually identified by the readable tags which are attached to the bags when the bar coded labels are attached. A new bar coded label can then be applied and the bag put back into the conveyor system or the bag can be hand carried to the appropriate destination.

Figure 2:
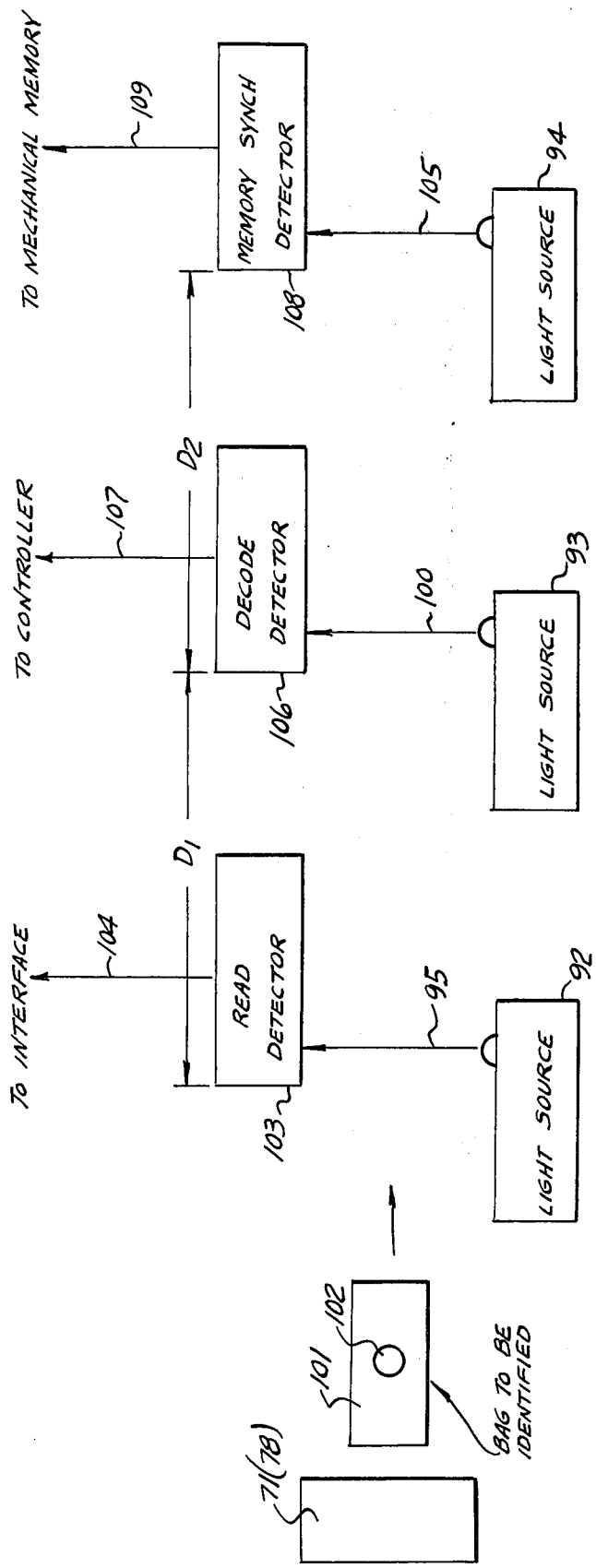
FIG. 2 shows the spacing of the photodetectors used in the inventive system.

Positioned between Reader 71 and Diverter 46 on North Sortation Conveyor 29 is a series of Photosensors 92, 93 and 94. A similar series of Photodetectors 96, 97 and 98 is positioned between Reader 78 and Diverter 33 on the South Sorting Conveyor 31. The arrangement and use of the photodetectors can be more fully understood by making reference to FIG. 2. The description of FIG. 2 is made with respect to Photosensors 92, 93 and 94. However, the series of Detectors 96, 97 and 98 operate in the identical manner and therefore, the description is equally appropriate with respect to both series of photosensors. Although it is not apparent from the Figure, Reader 71 and Photodetector 103 are closely situated so that Label 102 is scanned while Light Beam 95 is interrupted by Bag 101. As shown in FIG. 6, when Bag 101 disrupts Beam 95 for time interval $T_1$ to $T_2$, the data on Label 102 is scanned. The scanned data is transmitted over Line 104 to interface circuitry of the control system and compared to stored data to verify the presence of a readable label. The exact nature of the comparison process is explained more fully hereinafter. If a comparison is made, the data from Label 102 is transferred to the interface circuitry when Bag 101 unblocks Light Beam 95; in FIG. 6 this is shown as time $T_2$.

If a label data comparison has not been made at time $T_2$, a No-Read signal is generated and the bag is diverted to Claim Loop 32, or a spur designated to collect "No-Read" bags. A No-Read signal indicates one of three possible conditions (ignoring the possiblity of a system failure which is explained hereinafter):

1. The bag has no label.
2. The label is marred and unreadable.
3. The passenger arrived before a spur is assigned to his flight. This is a "No Match" situation because the bag cannot be directed to an assigned spur.

In either event, the bag is sent to either Claim Loop 32 or a designated spur for visual identification.

When Bag 101 blocks Light Beam 100 at time $T_3$ and Beam 95 has been unblocked, the data from the label is transferred to the decoding device over Line 107 and an identiciation of the spur destination made. The spur number is transferred to the output interface circuitry at time $T_4$ and temporarily stored. Time $T_4$ varies for each bag, depending upon the time required for the control circuitry to identify the spur assignment, but in all instances occurs before the bag unblocks Beam 100 at time $T_5$.

When the bag interrupts Light Beam 105 at time $T_6$, the spur number is passed to the timing device which generates the divert signal when the bag passes its destination spur. The timing device and spur signal generation are explained more fully hereinafter.

If Beam 100 is broken before Beam 95 is unblocked, the bag is too long for automatic handling by the diverters and is recirculated. If Beam 95 is blocked twice without Beam 100 being blocked between the blockages, several bags are too closely spaced and the bags are recirculated. While recirculating through Bag Spacers, the bags are spaced further apart automatically. This helps avoid damage to the diverters.

The spacing $D_2$ between Detectors 106 and 108 is different from $D_1$ and is selected to give the system time to perform several required operations. Firstly, data from the reader must be received and used to select the proper spur number. The system must have time to perform a check for errors which can occur; this is explained hereinafter. The spur identification must be made and output to the timing device. Also, because more than one reader is included in the system, there must be time to service all inputs from other readers before another input is received from the reader being serviced.

Figure 3:
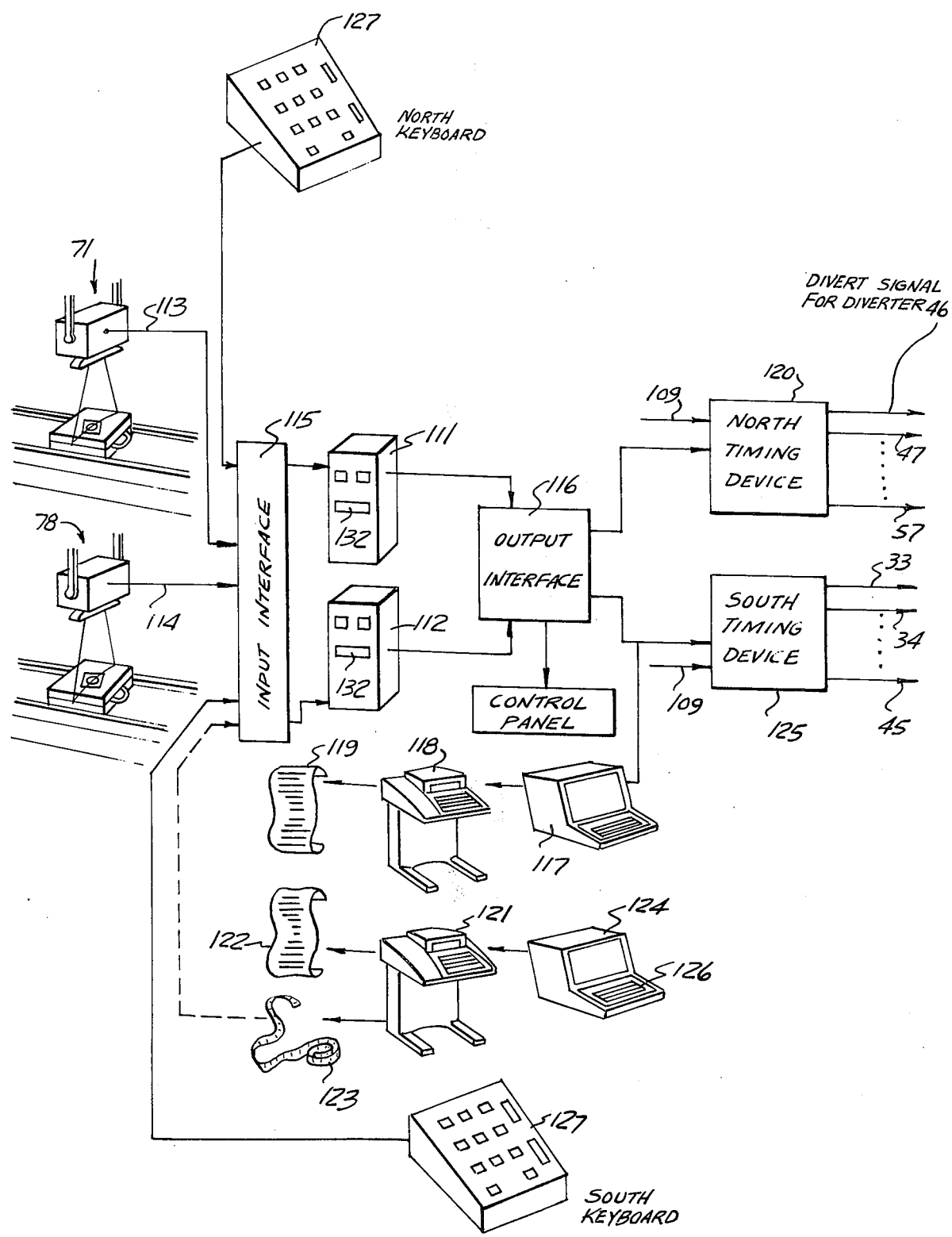
FIG. 3 is a pictorial representation of a complete data routing system.

FIG. 3 is a pictorial representation of the inventive system and is useful in understanding the flow and utilization of data within the system. Decoded information from Label Readers 71 and 78 is supplied to identical Controllers 111 and 112 through an Input Interface 115 over Lines 113 and 114, respectively. Two Controllers 111 and 112 are used to increase the reliability of the system and thus these are redundant controllers, and only one is used at a particular time. The Controllers 111 and 112 can be programmable computers such as the PDP-11R20 Computer marketed by Digital Equipment Corporation of Maynard, Massachusetts. However, the Controllers 111 and 112 can also be hardwired logic or read-only-memory logic.

The output of Controllers 111 and 112 is applied by way of Output Interface 116 to Timing Devices 120 and 125 which actuate Bag Diverters 33 to 57 arranged along the Baggage Sortation Conveyors 29 and 31 of FIG. 1. Timing Devices 120 and 125 receive the spur number signals from Line 109 when Beam 105 is broken. The timing of Timing Devices 120 and 125 is closely synchronized to the speed of Conveyors 29 and 31 and therefore being a timing sequence upon reception of the signal from Line 109. The timing sequence is selected in accordance with the speed of Conveyors 29 and 31 and the distance of the diverters from Photocell 109. Accordingly, the spur actuation signals are generated by Timing Devices 120 and 125 when the bags are at the entry points of the spurs.

Timing Devices 120 and 125 can be mechanical memories such as the Ball Memory Systems supplied by Ebbert Engineering Company. These mechanical memories are composed of a set of rotating discs, each of which carries a small ball. The balls cause the closing of switches located in the proximity of the discs and each diverter is actuated by a particular combination of switches. The speed of rotation of the discs is synchronized with the speed of the Sortation Conveyors 29 and 31. Accordingly, as a bag blocks Light Beam 105, the time required to reach a particular spur is known and the same amount of time constitutes a particular angular rotation of the drum. Therefore, the signal on Line 109 sets the balls into the drum. Switches corresponding to the diverter to be actuated are located at an angular distance from the ball setting point proportionally corresponding to the distance of the bag from the diverter. The balls, therefore, reach the switches at the same time the bag reaches the diverter and the diverting signal is generated at the proper time. By mechanically coupling the conveyors and mechanical memories, speed changes will affect both devices and the timing relationship will remain unaffected.

The data from Readers 71 and 78 is the decoded flight number from the baggage labels. The assignment of spurs to flight numbers is previously set into the Controllers 111 and 112 and therefore, the output signal from Interface 116 sets the proper balls to actuate the appropriate diverters so that the bags are diverted onto the proper spurs.

The output of Controllers 111 and 112 is also applied to a visually readable Terminal 117, such as cathode ray tube, to provide a visual display of the flight schedule and spur assignment. The visually displayed data can also include baggage counts of the number of bags on each of the spurs being loaded. The system also includes a Teletypewriter 118 which provides a Hard Copy 119 of all the data displayed on Cathode Ray Tube 117.

The Controllers 111 and 112 are provided with a long term flight schedule, such as the flight schedule for an entire week for example. Thus, as flights are changed or cancelled for various reasons, it is necessary to update the schedule within Controllers 111 and 112. This is accomplished by use of Teletypewriter 121 and Terminal 124. The schedule changes are typed into Terminal 124, which visually displays the changes including spur assignments. Terminal 124 actuates Teletypewriter 121 which provides a Hard Copy 122 of the scheduled changes and a Tape 123 of the schedule changes. The Tape 123 is then used to change the schedule programmed into Controllers 111 and 112. The changes inserted by way of Tape 123 are temporary so that the flights for the next day will be in accordance with the master flight schedule originally provided without the changes made the previous day. Also, if desired, it is possible to make additions and deletions to the master flight schedule.

As explained with respect to FIG. 1, bags which are circulating in Claim Loop 32 can be visually identified, supplied with a new label and injected into the system. However, it is also possible to visually identify the bags and to utilize Keyboard 127 which is conveniently located in the proximity of Code Reader 71. Keyboard 127 contains a set of keys which are used to manually inject the flight number of the bag into the system so that the Controllers 111 or 112 can properly route bags. This semiautomatic mode of operation is also used in the event of a failure of a Code Reader.

FIG. 4 pictorially shows a preferred embodiment of Keyboard 127. The keyboard includes ten buttons numbered 0 through 9. The operator presses one button for each digit of the flight number so that, for example, if a bag is to be assigned to Flight 852, the operator will press the 8, 5, 2 and the Dispatch button. Also, included is a Two Bag Button 128 which can be used to assign several bags to the same spur without depressing all buttons for all bags. For example, when three bags are destined for the same spur, the operator will push the buttons corresponding to the flight number and actuate the Two Bag Button 128 two times and then depress the Dispatch Button so that all three bags are diverted to the same spur. Also, included is a Clear Button 129 which the operator uses to remove incorrect inputs before they are forwarded to the Control System. Thus, for example, if instead of pushing 852, the operator inadvertently pushes 851, he merely presses Clear Button 129 and the data is ignored without ever having been entered into the Controller 111. Also, included is a Dispatch Button 131 which is pressed after the correct combination of the other buttons is pressed to effect input of the data to Controller 111.

The use of Keyboard 127 establishes a semiautomtic mode of operation for the system. In such an operation the keyboard operator visually reads the baggage tabs and manually injects the flight number into the system via Keyboard 127 as the bags pass by him at the vicinity of a reader. The flight data is then processed in the same manner as that received from the Label Readers 71 and 78, and hence the keyboards replace a reader and Photodetector 104.

The processing and flow of data in the system is the same for both the automatic and semiautomatic modes of operation. An interface circuit is provided between Label Readers 71 and 78 and Controllers 111 and 112. The exact nature of the interface is dependent upon the type of controllers used as well as the manufacturer. Accordingly, the details of the interface are within the purview of one skilled in the art and need not be presented herein.

The interface collects data from Code Readers 71 and 78, Keyboard 127 and Photodetectors 103, 107, 108 and 96, 97, 98. The data is formatted and transferred into the Controller in accordance with the output signals shown in FIG. 2.

The data transmission from all Label Readers and Keyboards is serial and asynchronous. The data is received at the computer input interface, formatted, and transmitted back to the source. When the data transmitted back to the source matches the originally transmitted data, the next data word is transmitted to the interface while the first word is temporarily stored at the input of Interface 115. If the data does not match, it is continually retransmitted in an attempt to get a match. If a match is not obtained before Decode Photocell 100 is broken, an error signal is generated and the bag is directed to the collection point for "No-Reads." If one or more "no comparisons" are received and then a comparison is finally made, and this occurs for five consecutive bags, then this is an indication that a failure is developing in the system. Accordingly, this condition results in an error display on the visual readout and the pending failure can be located and corrected.

Also, five consecutive bags resulting in a "No-Read" signal is an indication that a reader or photocell failure has occurred. This also results in an error display on the visual readout means.

The Input Interface 115 has the following capabilities:

1. Collect data from both readers and both keyboards simultaneously and independently of each other.
2. Assemble and temporarily store the collected data from either source.
3. Monitor the status of each reader, keyboard and transmission loop.
4. Transfer of reader and keyboard data into controller.
5. Provide a status word to the controller. The inputs for the status word are generated by the interface and detect the conditions described below.
    a. Reader status indicates the conditions of no-read, reader power failure, reader disconnect, photoswitch/conveyor failure, and gain range control.
    b. Reader interface status indicates the occurrence of a loop transmission failure.
    c. System operational status is indicated by mode detection and a passed bag condition.

The status and fault conditions are defined hereinafter.

6. Receive status data from the controller and provide decoded signals to the control panel for indicators which will display system status including:

a. The north sort-loop mode (auto, semi-auto)
b. The south sort-loop mode (auto, semi-auto)
c. Reader faults
d. Keyboard faults
e. Standby computer fault
f. Mode change faults The status and faults are defined hereinafter.

7. Provide the logic to select and display the assembled binary data word from any reader or keyboard independent of controller action.

FIG. 5 pictorially shows the Control Panel 132 of the Controllers 111 and 112. The panel includes a plurality of lights identified for example as Address Register, Data Run, Source, Destination, Address, etc. The various lights are illuminated in accordance with the operations being performed by the controller at a given time. Accordingly, the various functions of the system and the indication lights are described with respect to Table I as follows:

TABLE I

| INDICATOR LIGHTS | | |
|---|---|---|
| RUN | ON: | Indicates that the processor clock is running, processor has control of bus, and is executing an instruction. |
| | OFF: | Indicates that the processor is waiting for an asynchronous peripheral data response, or that the processor has surrendered its control to the console or a peripheral. |
| | REMARKS: | Flickers on and off during normal machine operation, except during the following programmed instructions: WAIT (completely on); HALT (completely off). |
| BUS | ON: | Indicates that a peripheral device is controlling the bus. |
| | REMARKS: | Only on when there is a bus malfunction or where a peripheral holds the bus for excessive periods of time, or in large systems when multiple devices are using the bus for DMA operations. When Bus and Run are off, bus control has been transferred to the console. |
| FETCH | FUNCTION: | Indicates that the processor is in the FETCH state and is obtaining an instruction. |
| | REMARKS: | Only FETCH and RUN lights are on during the FETCH state if no nonprocessor requests are honored. The console permits the user to immediately examine data just deposited without readdressing, to redeposits if necessary, and to continue without automatic incrementation. These sequences are associated with the functioning of DEP and EXAM Switches. The state of the switches can be read as 1's and O's under program control by reading address 777570. |
| EXEC | FUNCTION: | Indicates that the processor is in the EXECUTE state, performing an action specified by the instruction. |
| | REMARKS: | Only EXEC and RUN indicators are on during the EXECUTE state if no nonprocessor requests are honored. |
| DEST | FUNCTION: | Indicates that the processor is in the DESTINATION state and is obtaining destination operand data. |
| | REMARKS: | Destination and Run are both on during the DESTINATION state. Address lights may be on in various combinations. Bus is off if no nonprocessor requests are honored. |
| SOURCE | FUNCTION: | Indicates that the processor is in the source state and is obtaining source operand data. |
| | REMARKS: | Source and Run lights are both on during the Source state. Address lights may be on in various combinations. Bus is off if no nonprocessor requests are honored. |
| ADDR. (2 Lights) | FUNCTION: | Indicates bus cycles used to obtain address data during Source and Destination states. Binary code of lights indicates address cycle (1, 2, or 3) machine is in source or destination state. |
| | REMARKS: | When either light is on, either Source or Destination is on. Bus is off if no nonprocessor requests are honored. |
| SWITCH REGISTER 18 Key-Type Switches | FUNCTION: | Used to manually load 16-bit data word or address into processor. UP = ON = 1 DOWN = OFF = O |
| | REMARKS: | If the word in the Switch Register represents an address, it can be loaded into an Address Register by depressing LOAD ADDR. key. If the word contains data, it can be loaded into address specified by the ADDRESS REGISTER by lifting the DEP key. The data will appear in the DATA display. The console permits the user to immediately examine data just deposited without readdressing to redeposit if necessary and to continue without automatic incrementation. These sequences are associated with the functioning of DEP and EXAM Switches. The state of the switches can be read as 1's and 0's under program control by reading address 777570. |
| CONTROL SWITCHES (Depress register LOAD ADDR. to activate) | FUNCTION: | Transfers contents of switch register to bus address |
| | REMARKS: | The resulting bus address, displayed in the ADDRESS REGISTER, provides an address for EXAM, DEP, and START. |
| EXAM | FUNCTION: (Depress to activate) | Transfers contents of bus address for DATA display. Data address will appear in two ADDRESS REGISTER. |
| | REMARKS: | If the EXAM switch is depressed on succession, the contents of the next sequential bus address are displayed in DATA. This action is repeated each time EXAM is depressed provided no other Switch is used between these steps. |
| CONT | FUNCTION (Depress to activate) | Causes processor to continue operation from the point at which it had stopped. If ENABLE/HALT is on ENABLE, returns bus control from console to processor and continues |

TABLE I-continued

INDICATOR LIGHTS

| | | |
|---|---|---|
| ENABLE/ HALT | REMARKS: | program operation. If ENABLE/HALT is on HALT, causes the processor to perform a single instruction or a single bus cycle and stop. If program stops, this switch provides a restart without program clear. |
| | FUNCTION: (2-position switch) | Allows either the program or the console to control processor operation. ENABLE permits system to run normally. HALT stops the processor and passes control to the console. |
| | REMARKS: | Continuous program control requires the ENABLE mode. HALT mode is used to interrupt program control, perform single-step operation, or clear the system. HALT is used with the CONT switch to step the machine through programs and facilitate intermediate observations. |
| S-INST/ S-CYCLE (2-position switch) | FUNCTION: | Allows processor to step through program operation either one instruction or one bus cycle at a time. S-INST: processor halts after an instruction. S-CYCLE: processor halts after a bus cycle. |
| | REMARKS: | Enabled by ENABLE/HALT in HALT mode. |
| START (Depress to activate) | FUNCTION: | If ENABLE/HALT is on ENABLE, provides a system clear operation, then begins processor operation. A LOAD ADDR operation estabilishes the starting address. If ENABLE/HALT is on HALT, provides a system clear (initialize) only. Processor does not start. |
| DEP | FUNCTION: | Transfers contents of console SWITCH REGISTER to bus address. |
| | REMARKS: | After use data will appear on DATA display address in ADDRESS REGISTER. |
| ADDRESS REGISTER (18-Bits, divided in 3-bit sequence) | FUNCTION: | Displays the address of data examined or deposited. (16-bit in the PDP-11/15) |
| | REMARKS: | During a programmed HALT or WAIT instruction, display contains the address of the instruction. During direct memory operations, the processor is not involved in data transfer functions, and the address displayed is not of the last bus operation. When console switches are used, this display contains the following: LOAD ADDR - Transferred SWITCH REGISTER - Data DEP or EXAM - The bus address just deposited into or examined S-INST or S-CYCLE - The last processor address |
| DATA (16-Bit Display) | FUNCTION: | Displays data from processor data paths. This is not a single register but the sum of two late registers on the data paths (16-bit on the PDP-11/15) on both machines, no distinction necessary. Data is mainly loaded into this register by setting the data value into SWITCH REGISTER and lifting the DEP switch. REMARKS: When console switches are used, this display contains: LOAD ADDR - No indication DEP - The switch register just deposited EXAM - The data from the address examined S-INST - No indication when stepping through a program by single instruction S-CYCLE -Last data in the data paths WAIT - No indication HALT - Displays processor register RO when bus control is transferred to console during a HALT instruction. RESET - Displays register - RO for during of RESET (70 msec). |
| POWER LOCK OFF/POWER/ PANEL LOCK (3-position switch) | OFF: | Removes all power from processor 3 position switch. |
| | POWER: | Applies primary power to processor |
| | PANEL LOCK: | Disables all console controls except switch register key switches. |
| | REMARKS: | OFF: System is not being used. POWER: Normal operation; all console controls fully operational. |

The control logic for the inventive system when a programmable computer is used for Controller 111 is described with respect to FIGS. 7, 8, 9 and 10 which are also instrumental in describing the detailed operation of the inventive system. For convenience, assume that the entire system has been shut off so that no element therein had any power applied thereto. The start up, or initialization, procedure is the same irrespective of the manner in which the power was shut off. For example, a failure within the system can result in automatic shut off. The system can be intentionally shut off, or the system can be inadvertently shut off due to a source power failure, etc. The initialization or start up results in the performance of a series of tests which are reported on the CRT Visual Display 117 of FIG. 3. As is explained hereinabove, each coding station includes a scanner for automatic operation of the system, a sequential keyboard for semiautomatic operation of the system, and a manual keyboard for manual operation of the system. Accordingly, when the system is first started up or energized, the operativeness of each element of each coding station is tested for various faults and the results of the tests reported out on the CRT. The test is based on the bits of a coding station status word which is set into each coding station. For the computer chosen here the coding station status word sent to Controller 111 or 112 is a sixteen bit word arranged as follows:

the power went off. In this regard it should be noted that each of the coding stations within the system can

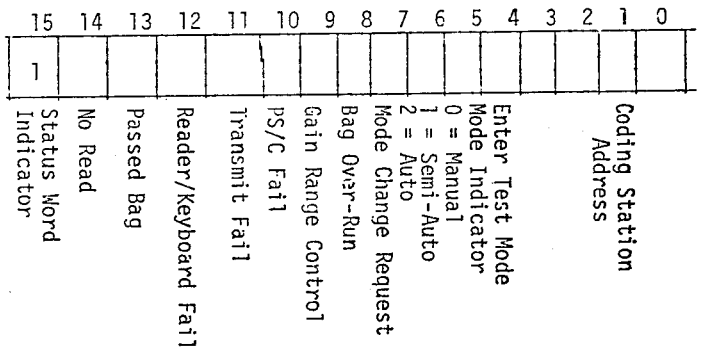

corrective action taken, is explained hereinafter with respect to FIG. 9.

When no failures are present at Step 139, this is an indication that the scanning mechanism is operative and Step 141 is entered to check the Sequential Keyboard 127 of FIG. 3 to determine that it is operative. The sequential keyboard failures are also determined by the status word shown hereinabove and a logic ONE at Bit 9 or 12 indicates that the Reader or Keyboard is malfunctioning, depending upon the mode of operation, while a Logic ONE at Bits 8, 10, 11, 13 or 14 is an indication that there is a failure or improper operation of the interface circuitry.

Figure 7:
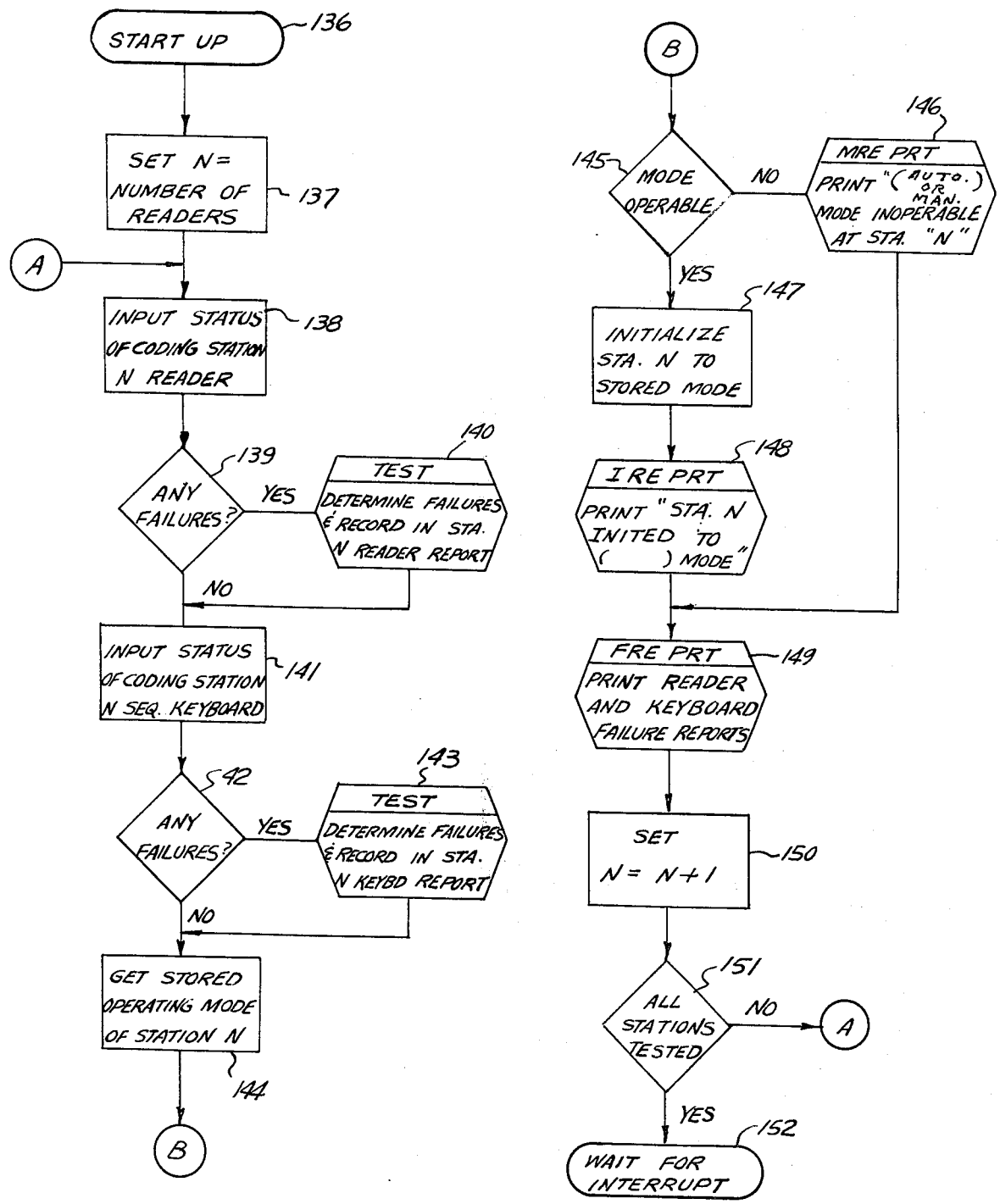
FIG. 7 is a preferred embodiment of start-up logic for the inventive system.

When no errors are indicated at Step 142, or after the type of failure has been identified at Step 143, the logic sequences to Step 144 which is a determination of the operating mode of the station being tested at the time Referring now to FIG. 7, Functional Step 136 represents entrance into the start-up procedure which initiates the operation of the entire system. Functional Step 137 shows that the number of coding stations contained within the system is previously set into the system and every one of the stations is individually tested in sequence. As indicated at Functional Step 138 the status word of the first coding station is injected into the system. This word is used to test for system failures as indicated at Step 139. As indicated at Step 140, if a failure is detected, the type of failure is determined and recorded in the visual CRT report for the coding station being tested. The types of failures which can occur and the manner of testing for them are determined from the status word. When testing for faults in the bag photodetector, a logic ONE present at Bit 10 indicates a failure of the Photodetector 103 and as is explained hereinafter, results in the output of such an indication. A Logic ONE at Bit 12 is an indication that there is a power failure in the scanner or keyboard and results in the indication of a reader failure in the status report on the CRT. In similar manner, a Logic ONE at Bit 9 indicates that the internal loop gain of the code reader has fallen to a critically low level.

A Logic ONE at either of Bits 8, 11, 13 or 14 indicates that there is a failure in the interface circuitry which couples the reader and the controller. This is so because a Logic ONE bit cannot exist for any of these functions unless a bag has been passed through both Read Photodetector 103 and Decode Photodetector 107 with the automatic or semiautomatic mode of operation enabled. The causes of these errors, and the be in different operating modes at a given instant. Anytime the power is shut off and subsequently reapplied, the coding station is returned to the operating mode which existed for that station at the time the power shutdown occurred.

After the previously stored mode is determined, a decision is made at Step 145 to determine whether or not the coding station is capable of operating in that mode. Thus, if an error was found in any of the Tests 140 or 143, the system sequences to Step 146 and prints the remembered mode as being inoperative at the coding station under test. The station is put into the manual mode and the system sequences to Step 149 which results in the provision of a failure report which identifies the specific error on the CRT 117.

Returning again to Step 145, when no errors are found, the mode is operable and the coding station is put into the operating mode which was in effect at the time the system shut down. Then, as indicated at Step 148, the operating mode of the station is printed out on CRT 117. Step 149 is the used to print out the status report that no error was detected for the coding station just tested.

The system then sequences to Step 150 to initiate the testing of the next coding station when Step 151 indicates that all stations have not been tested. The entire testing routine is repeated for every coding station as indicated by Terminal A at Step 151 and 138. When Step 151 shows that all coding stations have been tested, Step 152 is entered and the system waits for an interrupt signal. Such a signal is applied when bags are being read in a scanner in the automatic mode or data is being entered from a sequential keyboard in the semiautomatic mode, or from a mode selector button used to change modes.

Figure 8:
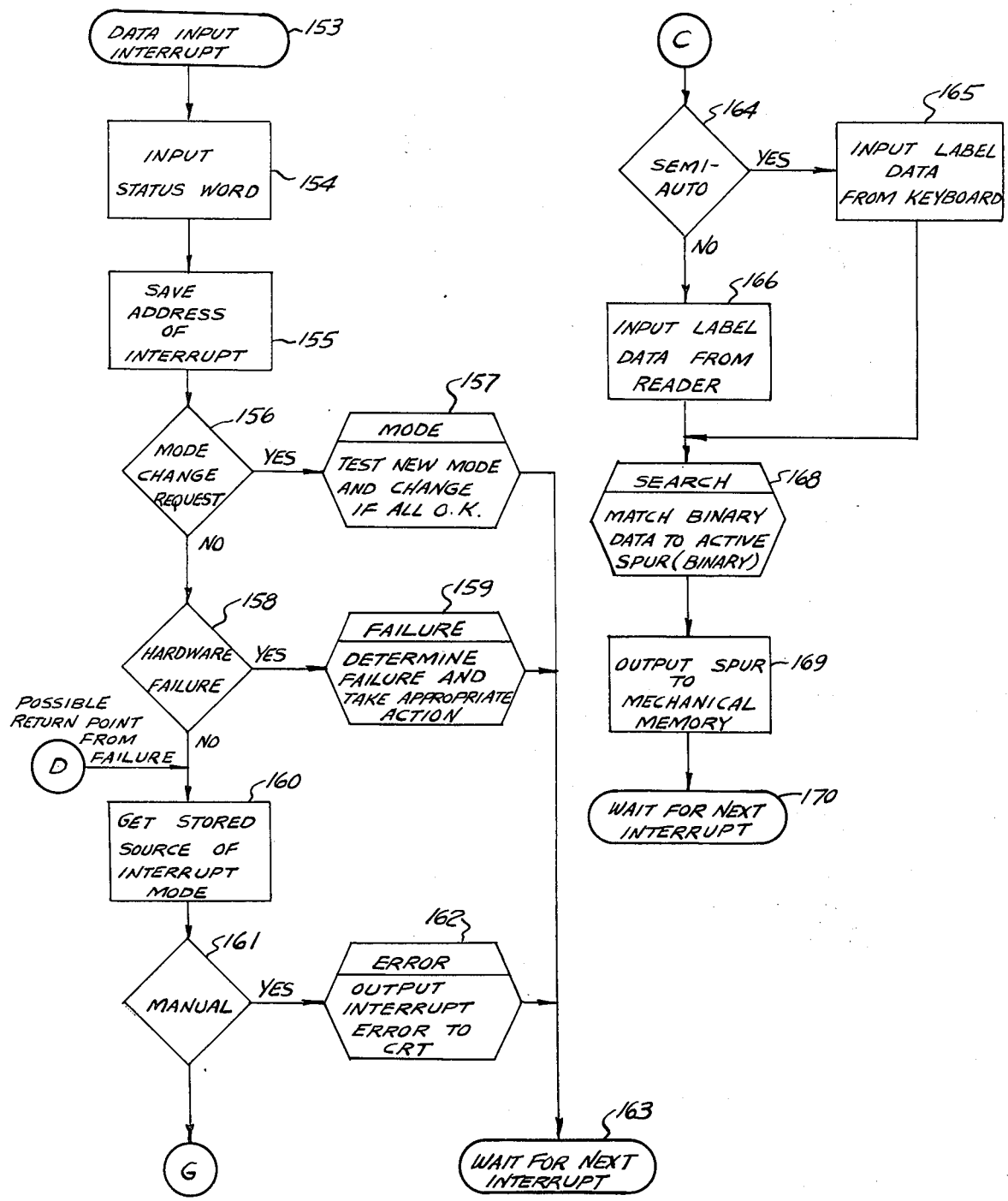
FIG. 8 is a preferred embodiment of interrupt logic for the inventive system.

The control logic which becomes active when an interrupt is received is described with respect to FIG. 8. Functional Block 153 indicates that an interrupt signal has been received and the interrupt routine is entered into. It should be noted that an interrupt occurs when a bag breaks Light Beam 100 extending between Light Source 93 and Decoding Detector 106 of FIG. 2. Thus, the coded data can be from a reader or a sequential keyboard and it makes no operational difference to the system. An interrupt also occurs when a button is pushed on mode selection keyboard (not shown). This keyboard contains four keys which are respectively used to select the automatic mode, the semiautomatic mode, the manual mode, and a test operation. The test operation is used to verify that the system is operating properly and is pushed simultaneously with either the automatic mode or semiautomatic mode button. The mode selection is explained in detail hereinafter with respect to FIG. 10.

When an interrupt is received at Step 153, the status word is input to the system as indicated at Step 154. This status word is the word shown hereinabove the first four bits of which are used to identify the coding station from which the interrupt is received and the other 12 bits of which are used to relay other information to the system.

As indicated at Step 155, the first four bits of the status word which are Bits 0, 1, 2, and 3 represent the address of the interrupting station. Next, Step 156 is utilized as a verification that the interrupt is a request for a mode change. A mode change request is always indicated by the presence of a 1 on Bit 7 of the status word. The mode change request is accompanied by an indication of which mode is being requested by use of Bits 4, 5 and 6. As an example, when all three of these bits are 0, a manual mode request is indicated, a One on Bit 5 indicates a semiautomatic mode request, and One's on Bits 5 and 6 indicate an automatic mode request obviously; other combinations can be used.

When a mode change is being requested, the logic flow sequences to Step 157 to test for verification that the requested mode is permissible under existing conditions. This operation is described in detail hereinafter with respect to FIG. 10. After the mode test is completed, the system sequences to Step 163 to wait for the next interrupt.

Returning to Step 156, if the interrupt is not a mode change request, the system sequences to Step 158 to test for hardware failure. If a failure is indicated, the system sequences to Step 159 to determine the failure and take appropriate action. The details of this operation are explained hereinafter with respect to FIG. 9. After the appropriate action is taken, the system sequences to Step 163 and waits for the next interrupt.

If no hardware failures are indicated at Step 158, the system sequences to Step 160 which returns to the stored source of the interrupting signal and sequences to Step 161 to determine whether or not the interrupting station is in manual mode. An error condition exists if the interrupt comes from a reader or keyboard at a station in the manual mode.

Returning to Step 161, if the interrupting station is not in manual mode, the system sequences to Step 164 (via Terminals C) to determine whether or not the interrupting station is in the semiautomatic mode of operation. When the station is in the semiautomatic mode, the system sequences to Step 165 and inputs the label data from the keyboard into the system, after which Step 168 is entered. At Step 168 the decoded data received from the keyboard is matched to the stored flight numbers within Controller 111 and the spur number indication is output to the mechanical memory as indicated at Step 169. After the spur number is applied to the mechanical memory, the system sequences to Step 170 to wait for the next interrupt from one of the decoding stations.

Referring again to Step 164, if the interrupting station is not in the semiautomatic mode of operation, the system sequences to Step 166 to input decoded data from a reader passing under one of the label readers. This data is then compared to the stored flight numbers at Step 168 and the spur number output generated and applied to mechanical memory at Step 169 after which the system waits for the next interrupt from either a keyboard or a label reader within the system.

Figure 9:
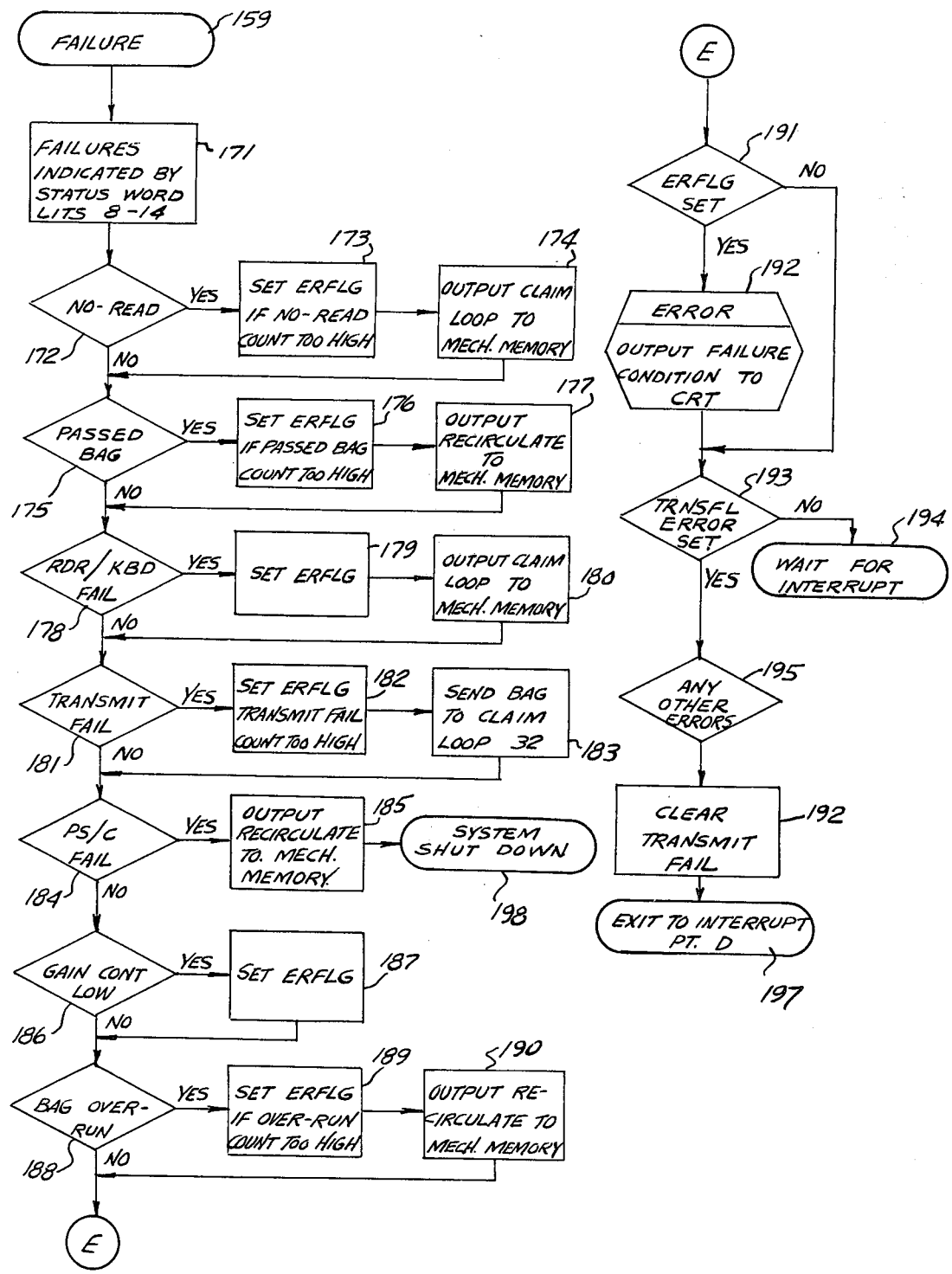
FIG. 9 is a preferred embodiment of failure test logic.
Figure 10:
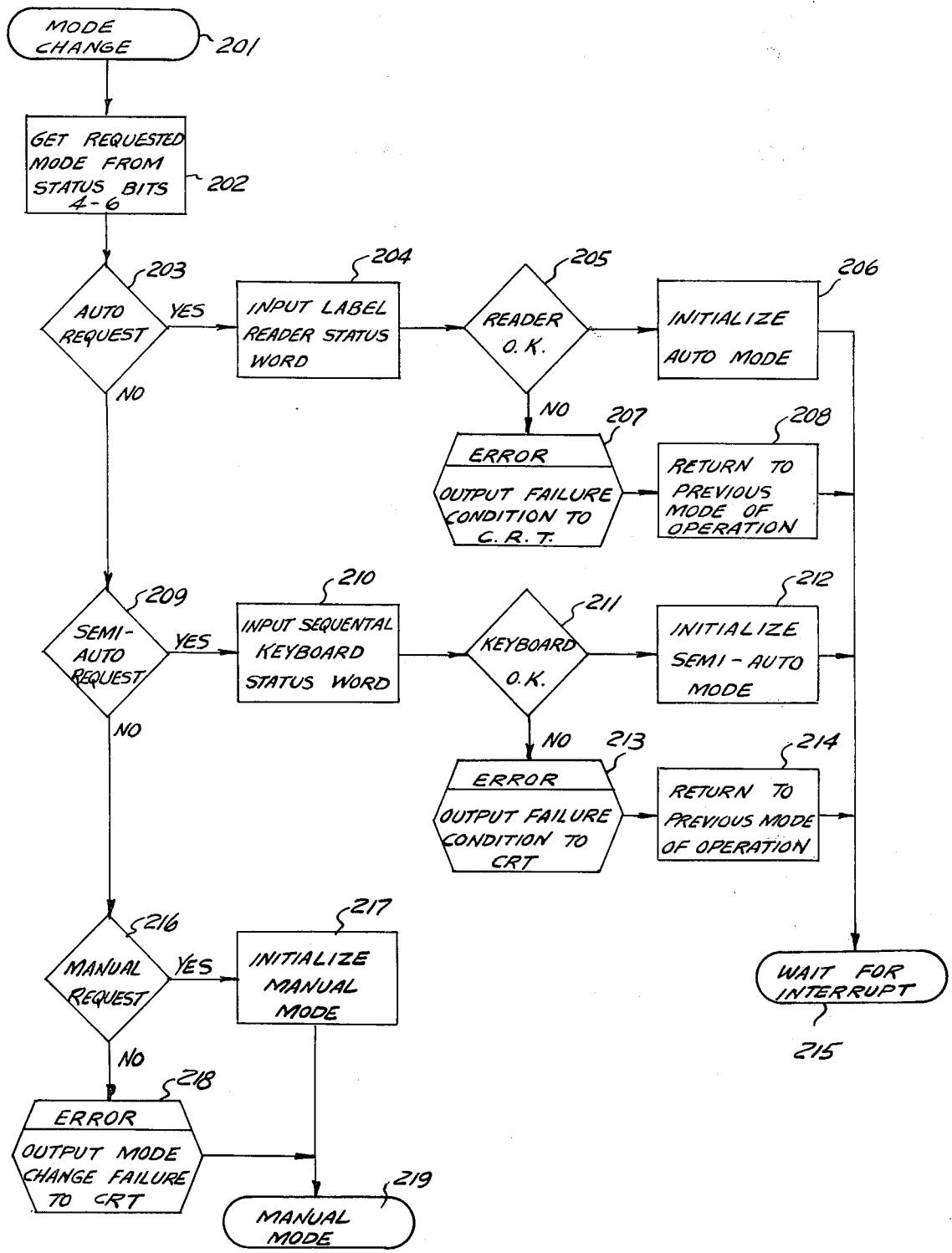
FIG. 10 is a preferred embodiment of mode change logic.

The failure check 159 shown as a portion of FIG. 8 is shown in detail in FIG. 9. A Yes indication that a hardware failure has occurred is indicated at 159 of FIG. 9. As explained hereinabove, the failures are indicated by Bits 8 through 14 of the status word. This is indicated at Step 171.

A One indication on Bit 14 is a No-Read error and as indicated at Step 172 of FIG. 9 when this occurs, an error flag is set at Step 173 and the bag is directed to Claim Loop 32 (FIG. 1) as indicated at Step 174. A No-Read error occurs when a bag passes under a reader with a mutilated label without any label.

The Passed Bag error at 175 is indicated by the presence of a One bit at Bit 13 of the status word. When this occurs, the error flag is set and the bag is recirculated and reread when it again passes through a label reader. A Passed Bag error occurs when no data has been received from either a label Reader or Keyboard but Light Beam 100 extending between Light Source 93 and Decode Detector 106 of FIG. 2 is broken.

The test performed at Step 178 is the reader-keyboard power test to determine that these elements have sufficient power. This test is indicated by a One at Bit 12 of the status word. When such a failure occurs, the system generates an output to the claim loop and also actuates error light and an audible alarm to inform the operator that a failure has occurred.

The test for proper transmission between the decoding station and the controller is shown at Step 181. During the time that a bag is being scanned by the reader, Light Beam 95 of FIG. 2 is broken and the data from the label is transmitted to the input interface and retransmitted back to the decoder interface where the transmitted and retransmitted data are compared to verify that the data was properly transmitted. If an error comparison was detected, but subsequent transfers of the same data resulted in satisfactory comparisons, Bit 11 in the status word is set to One. This failure indication is recorded by the controller and an error flag is set as indicated at Step 182.

Test 184 is a photocell conveyor test and a failure is indicated by a One at Bit 10 of the status word. A failure occurs when Read Detector 103 fails or when the conveyor stops with a bag in front of the reader. The occurrence of this failure results in a signal directing that the bag be recirculated upon start up of the conveyor and the system exits to Step 198 to wait for the next interrupt.

The Gain Test at Step 186 is used to test the laser power and a failure can also show if the scanner glass is dirty. A failure indication results in the setting of an error flag on the control panel. The occurrence of this failure is indicated by a One at Bit 9 of the status word.

The Bag Overrun Test at Step 188 occurs when bags are too close together so that Light Beam 100 of FIG. 2 is broken before Light Beam 95 is unbroken. The occurrence of this failure is indicated by a One at Bit 8 of the status word and results in the bags being recirculated to be reread by a scanner.

At Step 191, if any of the above errors has occurred in a preselected excessive quantity, Step 192 shows that the nature of the error is output to the CRT and Step 193 is entered into. If no message is to be displayed, Step 192 is bypassed and Step 193 is entered into.

The results of Step 193 are controlled by whether or not a transmission error failure has been detected at Step 181. If no such error has occurred, error checking is complete and the system waits for the next interrupt at Step 194.

When a transmission failure has been indicated at Step 193, Step 195 is performed. This step determines whether or not any of the other errors has also occurred. If one of the other errors has occurred, the bag is handled in accordance with the particular error and the system proceeds to Step 194 to wait for the interrupt from the next succeeding bag. If none of the other errors has occurred, good data was received and therefore is processed before the transmission error flag is cleared and the system sequenced to Step 197 which results in re-entrance of the logic at Terminal D of FIG. 8.

At Step 203, a request for a transfer into the automatic mode is indicated by a One on two of Bits 4 to 6 of the status word. When this condition occurs, the label reader status word is input at Step 204 and at Step 205 when the readers tests show no failures, the system is transferred into the automatic mode at Step 206 and the system exits to wait for an interrupt at Step 215.

When a reader failure indication is received at Step 205, Step 207 outputs the failure condition to the CRT for visual reading and at Step 208 the system is returned to the previous mode of operation of the particular decoding station which is requesting the operational mode change.

When the request for a mode change is not an automatic request, the semiautomatic request verification is made at Step 209. At Step 210 the sequential keyboard status word is input and if the keyboard has not failed any tests, Step 211 sequences to Step 212 and the semiautomatic mode transfer is made and the system exits to the wait for interrupt Step 215. When the keyboard fails a test, the failure indication is output to CRT at Step 213 and the decoding station requesting the mode change is returned to its previous mode of operation at Step 214 after which the system waits for the next interrupt at Step 215.

Referring again to FIG. 8, when the interrupt is a mode change request at Step 156, which is indicated by the presence of a One at Bit 7 of the status word, the test mode routine is entered into as indicated at Step 157. The details of the test mode change are described with respect to FIG. 10. Entrance into the mode change logic is indicated at Step 201, and at Step 202 the particular mode requested is obtained from Bits 4 through 6 of the status word as explained hereinabove.

When the interrupt is not a request for change to either automatic or semiautomatic operation, the manual operation request step is entered into at Step 216. This immediately results in the initialization of the manual mode because the manual mode of operation completely bypasses the controller and all test routines. If the interrupt is not a request for a manual mode, an error output is indicated on the CRT at Step 218. The interrupt is therefore ignored and Exit Step 219 entered to wait for the next interrupt.

Figure 11:
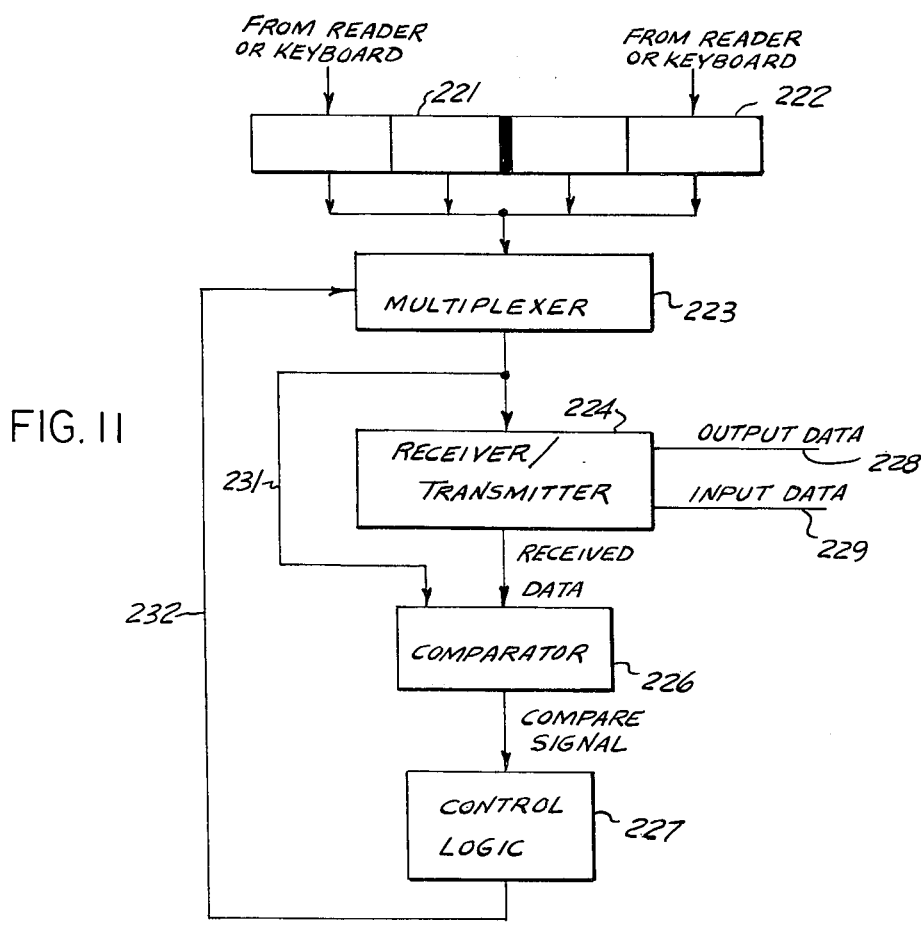
FIG. 11 shows a preferred embodiment of the interface circuitry available at each reader station and each keyboard.

FIG. 11 is a preferred embodiment of the interface circuitry which will be located at the data sending station. It should be understood that a circuit identical to that disclosed in FIG. 11 will be located at each reader station and at each keyboard station.

The interface circuitry consists of two Registers 221 and 222. There are two of such registers in each of the transmitting interface circuits because the system is capable of reading two labels on each bag. When a bag is carrying two labels, the data from label will be stored in the Register 221 and data from the other label will be stored in the Register 222. The data from Registers 221 and 222 is provided to a Multiplexer 223. The Multiplexer 223 accepts data in 8 bit increments, 2 bits are the address bits which indicate where the data will be directed and the other bits are the data bits from the decoded label which identify the flight and destination of the bag carrying the label.

After the data is formatted in Multiplexer 223, it is provided to a Universal Asynchronous Receiver/Transmitter 224. Receiver/Transmitting devices of this type are known in the art, for example Model AY5-1012 supplied by General Instrument Company can be used for the asynchronous Receiver/Transmitter in the embodiment disclosed in FIG. 11.

The output of Receiver/Transmitter 224 is provided on Line 228 in serial form and consists of a start bit, 8 data bits and parity bits and then stop bits which indicate the end of the information from one transfer of data from a label. Depending upon the number of data bits from the label, only a portion of the label data may be transferred on each transmission or the entire label may be transferred. The exact arrangement of data bits is within the purview of those skilled in the art and can vary in accordance with the required capabilities of the system. This is also true of the number of data bits transferred during each data transmission. The data on output Line 228 is provided to the interface circuitry provided at the master controller described hereinafter with respect to FIG. 12. The controller interface circuitry receives data from Receiver/Transmitter 224 and immediately returns the data to Receiver/Transmitter 224 by way of Input Line 229. The received data is supplied to a Comparator 226. It should be noted that the output of Multiplexer 223 is also provided to Comparator 226 over Line 231. Accordingly, the transmitted data is compared with the received data in Comparator 226 and when a comparison signal is given, Control Logic 227 is actuated to provide a selection signal over Line 232 to thereby actuate the Multiplexer 223. This signal causes Multiplexer 223 to select another portion of the label information for transfer to the master controller.

Figure 12:
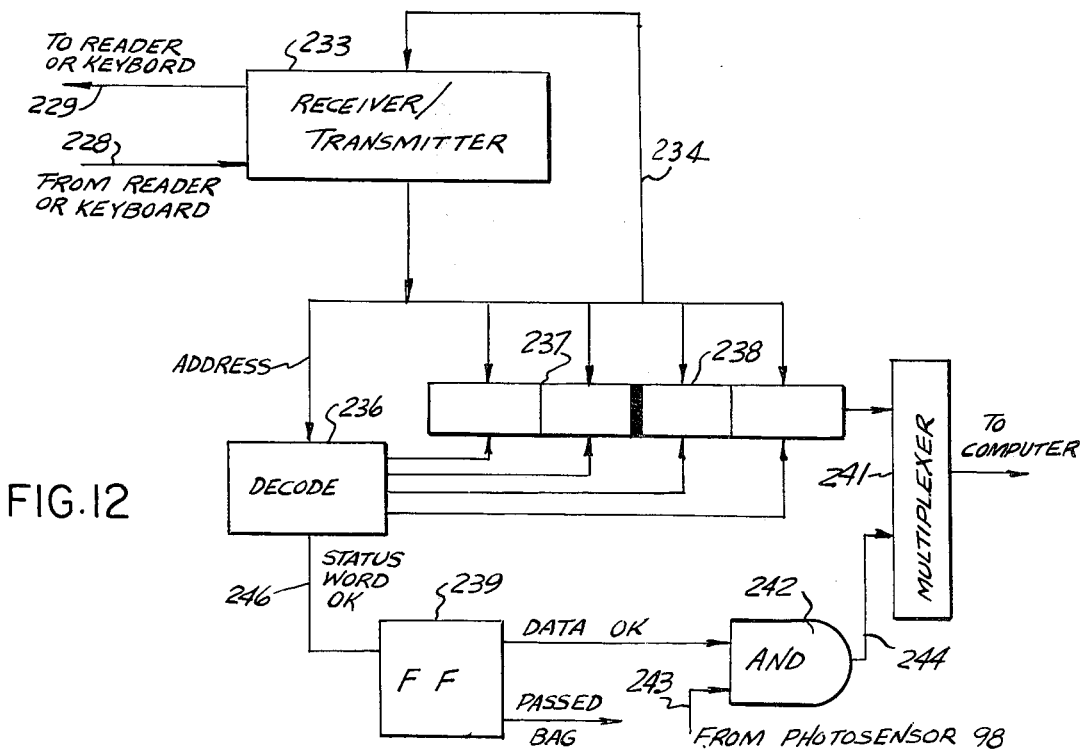
FIG. 12 shows a preferred embodiment of the interface circuitry available at the master controller.

FIG. 12 shows a preferred embodiment of the interface circuitry located at the master controller. It should be noted that here again there is one circuit similar to that shown on FIG. 12 for every code reader and every keyboard.

The data from Receiver/Transmitter 224 of the sending unit is provided on Line 228 as an input to Receiver/Transmitter 233 of the receiving unit. Receiving unit 233 also is a Universal Asynchronous Transmitter/Receiver identical to the units 224 contained within the coding station interface circuitry. Immediately upon receipt, the data is circulated by way of Line 234 back to the Receiver/Transmitter Unit 233 and is provided to the sending Receiver/Transmitter Unit 224 by way of Line 229. This constitutes the transmission retransmission cycle of the label data described hereinabove. The data is also supplied to Registers 237 and 238, each of which receives the data from an individual label in the same fashion as Registers 221 and 222 of FIG. 11. The address associated with the label data is supplied to the Decode Circuitry 236 which actuates the Registers 237 and 238 so that the data is applied to the proper register.

When Decode Circuitry 236 yields a status word okay output on Line 235, an input is supplied to Flip-Flop 239 which yields a data okay output on Line 247. The status word okay is provided by Decode Circuitry 236 when the sending unit provides an error-free status word as a result of successful transmission-retransmission of each portion of the label data. The data okay output from Flip-Flop 239 on Line 247 is provided to one input of a dual input AND gate 242. AND gate 242 also receives an input from Photosensor 98 on Line 243. Accordingly, when the bag passes photosensor 98 and provides a signal on Line 243, AND gate is enabled and provides a signal to Multiplexer 241 over Line 244. Upon the application of the output from AND gate 248, the data in the Register 237 or 238 is provided by Multiplexer 241 to the computer or other memory mechanism. The data is then compared with the stored data and a spur signal generated and provided to the Timing Device 120 or 125 shown in FIG. 3.

We claim:

1. A system for automatically directing items bearing destination coded labels to selected collection locations along a conveyor system, said conveyor system having a plurality of appropriately located input areas and at least one reading area and being configured so that all said input areas communicate with a reading area, said conveyor system also including a plurality of said collection locations and means for diverging items from said conveyor to said locations in accordance with data encoded on said labels; said system for automatically directing including:

means for scanning said labels located at each of said at least one reading area, said means for scanning including decoding means for generating decoded label data in accordance with the data encoded on said label;

system controller means responsive to said decoded label data, said system controller means having storage means for storing an assignment schedule assigning said label encoded destinations to said collection locations, said system controller means generating a collection location identification signal in accordance with said decoded label data and said assignment schedule;

timing means synchronized with the speed of said conveyor, said timing means receiving said collection location identification signal and generating a divert signal when the item bearing the decoded label reaches the assigned collection location, said means for diverting receiving said divert signal and diverting said item to said assigned collection location;

first item sensing means in the proximity of said means for scanning, said item sensing means sensing the travel of said item past said means for scanning;

said decoding means generating said decoded label data when a label is properly decoded when said item sensing means senses said item, and a no-read signal when a label is not properly decoded before said item sensing means ceases to sense said item; and second item sensing means located to receive items after said first item sensing means, said first and second item sensing means being separated by a preselected spacing chosen so that the sensing of two items by said first sensing means before the sensing of an item by the second sensing means indicates that the items are too closely spaced, and the sensing of an item by said second sensing means before said first sensing means ceases to sense the same item indicates that the item is too large for proper dimension.

2. The system of claim 1 further including third sensing means located to receive items after said second sensing means, said third sensing means applying a synchronizing signal to said timing means when an item which has ceased to be sensed by said second sensing means is sensed by said third sensing means.

3. The system of claim 1 further including input interface means;

and wherein said means for scanning includes means for transmitting said decoded data to said interface means, means for receiving retransmitted data from said interface circuit, and means for comparing said decoded data and said retransmitted data;

first item sensing means located to sense said item simultaneous with the scanning of said item;

said decoding means generating a data ready signal while said item is being scanned and when said means for comparing indicates said decoded data and said retransmitted data compare, and a no-read signal after said item has been sensed and said means for comparing failed to indicate that said decoded data and said retransmitted data compare; and second item sensing means located to receive items after said first item sensing means, said first and second item sensing means being separated by a preselected spacing chosen so that the sensing of two items by said first sensing means before the sensing of an item by the second sensing means indicates that the items are too closely spaced, and the sensing of an item by said second sensing means before said first sensing means ceases to sense the same item indicates that the item is too large for proper dimension.

4. The system of claim 3 further including third sensing means located to receive items after said second sensing means, said third sensing means applying a synchronizing signal to said timing means when an item which has ceased to be sensed by said second sensing means is sensed by said third sensing means.

5. The system of claim 1 wherein said system controller includes first storage means for storing a master schedule of destination and collection location assignments;

and second storage means for storing an active schedule of destination and collection location assignments, selected portions of said master schedule serving as said active schedule for preselected periods and continually changing from period to period.

6. The system of claim 5 further including means for temporarily revising said active schedule independently of said master schedule.

7. The system of claim 4 wherein said system controller includes first storage means for storing a master schedule of destination and collection location assignments;

and second storage means for storing an active schedule of destination and collection location assignments, selected portions of said master schedule serving as said active schedule for preselected periods and continually changing from period to period.

8. The system of claim 7 further including means for temporarily revising said active schedule independently of said master schedule.

9. A method of automatically directing articles carrying destination encoded labels to collection locations positioned with respect to a conveyor system including means for scanning and decoding said labels and means for diverting said articles from said conveyor system to said collection locations comprising the steps of:

storing a schedule of destination-collection location assignment;

said step of storing a schedule of destination-location assignments including the steps of:

storing a long term schedule of assignments, storing a short term schedule of assignments, said short term schedule being periodically selected from said long term schedule, and using said short term schedule for said comparing step, scanning and decoding said labels to produce decoded destination data;

comparing said destination data to said schedule and providing a destination signal;

applying said destination signal to a timing device;

synchronizing said timing device to the speed of said conveyor system;

generating a divert signal at a timed interval after applying said destination signal to said timing device;

applying said divert signal to one of said means for diverting to divert an article to the collection location dictated by said schedule.

10. The method of claim 9 further including the step of verifying that the destination data is accurately made available for said comparing step.

11. The method of claim 10 further including the first steps of:

detecting the presence of said article during said scanning step;

providing a data ready signal when a verification of accurate destination data is received before said detecting step is complete, and a no-read signal when said detecting step is complete before a verification of destination data is obtained.

12. The method of claim 11 further including a second step of detecting the presence of said article;

timing the first and second detecting steps to assure article spacing and size by performing the substeps of:

using two consecutive article detections in the first detection step before an article detection in the second detection step to indicate that the articles are too closely spaced;

and using the initiation of the second detection step before the termination of the first detection step to indicate that the detected article is too large.

13. The method of claim 11 further including a second step of detecting the presence of said article;

timing the first and second detecting steps to assure article spacing and size by performing the substeps of:

using two consecutive article detections in the first detection step before an article detection in the second detection step to indicate that the articles are too closely spaced;

and using the initiation of the second detection step before the termination of the first detection step to indicate that the detected article is too large.

\* \* \* \* \*

UNITED STATES PATENT OFFICE
CERTIFICATE OF CORRECTION

PATENT NO. : 3,915,284
DATED : October 28, 1975
INVENTOR(S) : Ronald P. Knockeart, Edwin A. Johnson and Frank A. Russo It is certified that error appears in the above-identified patent and that said Letters Patent are hereby corrected as shown below:

IN THE SPECIFICATION

Column 6, line 51 delete "circulated" and insert therefor ---recirculated---;

Column 8, line 35 delete "being" and insert therefor ---begin---;

Column 15, The text (2 paragraphs + 1 1/2 lines) starting with "corrective action---" in line 20 through "---at the time" in line 36 should appear after line 68, the last line in Column 15.

IN THE CLAIMS

Claim 1 - Col. 21, line 29 delete "diverging" and insert therefor ---diverting---.

Signed and Sealed this twenty-seventh Day of April 1976

[SEAL]

Attest:

RUTH C. MASON
Attesting Officer

C. MARSHALL DANN
Commissioner of Patents and Trademarks